United States Patent
Park et al.

[11] Patent Number: 5,987,027
[45] Date of Patent: Nov. 16, 1999

[54] CROSS-CONNECT MULTIRATE/MULTICAST SDH/SONET REARRANGEMENT PROCEDURE AND CROSS-CONNECT USING SAME

[75] Inventors: Won Bae Park, Atlanta; Henry Walter Lilly Owen, Smyrna; Ellen Witte Zegura, Decatur, all of Ga.

[73] Assignee: Alcatel, Paris, France

[21] Appl. No.: 08/745,379

[22] Filed: Nov. 8, 1996

[51] Int. Cl.⁶ ............ H04L 12/28; H04L 12/50; H04L 12/56; H04Q 11/00
[52] U.S. Cl. ............................. 370/360; 370/907
[58] Field of Search ............................ 370/351, 357, 370/358, 360, 369, 370, 380, 386, 388, 907

[56] References Cited

U.S. PATENT DOCUMENTS

| | | | |
|---|---|---|---|
| 4,417,244 | 11/1983 | Melas | 340/825.8 |
| 4,952,930 | 8/1990 | Franaszek | 340/825.8 |
| 5,323,390 | 6/1994 | Pawelski | 370/371 |
| 5,343,194 | 8/1994 | Bowdon | 340/827 |
| 5,345,441 | 9/1994 | Parker et al. | 370/370 |
| 5,408,231 | 4/1995 | Bowdon | 340/826 |
| 5,448,567 | 9/1995 | Dighe et al. | 370/94.2 |

OTHER PUBLICATIONS

Won Bae Park, H.W. Owen and E. W. Zegura, "SONET/SDH Multicast Routing Algorithms in Symmetrical Three–Stage Networks," ICC'95, pp. 1912–1917, 1995.

Ohta S. and Ueda H., "A Rearrangement Algorithm for Three–Stage Switching Networks," *Electron. & Commun. Japan.*1, (U.S.A.) vol. 70, No. 9, pp. 68–77, Sep. 1987.

Y. Yang and G.M. Masson, "Nonblocking Broadcast Switching Networks," *IEEE Trans. Commun.*, vol. 40, No. 9, pp. 1005–1015, 1991.

A. Jajszczyk and J. Rajski, "The Effect of Choosing the Switches for Rearrangement in Switching Networks," *IEEE Trans. Commun.*, vol. COM–28, No. 10, pp. 1832–1834, Oct. 1980.

T–C Hou, "Hierarchical Path Hunt in a Broadband Multirate Circuit Switching Fabric," *IEEE J. Select. Areas Commun.*, vol. 14, No. 2, pp. 386–398, Feb. 1996.

*Primary Examiner*—Jason Chan
*Assistant Examiner*—Jasper Kwoh
*Attorney, Agent, or Firm*—Ware, Fressola, Van Der Sluys & Adolphson LLP

[57] ABSTRACT

A connection procedure for finding by rearrangement a path for multirate, multicast traffic through an SDH cross-connect with subnetwork connection protection. If no free path for a new payload through the SDH switching hardware is available, the switching procedure looks for a path that is adequate and blocked by the least existing payload capacity. If the hunt is successful, the procedure rearranges the existing connections to make possible a path for the new payload. The procedure does not interrupt the existing connections; thus it is a "hitless" procedure. Connections for existing payloads that must be moved to make way for the new payload are queued and the connection procedure is applied recursively, to each in turn, until the queue is empty.

13 Claims, 4 Drawing Sheets

CROSS-CONNECT MULTIRATE/MULTICAST SDH/SONET REARRANGEMENT PROCEDURE AND CROSS-CONNECT USING SAME

TECHNICAL FIELD

The present invention pertains to rearranging Clos networks. More particularly, this invention relates to a method and a system that finds a path through a Synchronous Optical Network or Synchronous Digital Hierarchy (SONET/SDH) communications cross-connect for several kinds of connections, including: multirate unicast unidirectional, multirate unicast bidirectional, multirate subnetwork connection protection unidirectional, multirate subnetwork connection protection bidirectional, and multirate multicast connections.

BACKGROUND OF THE INVENTION

Implementations of SONET/SDH circuit-switched cross-connect switching structures may be designed to be non-blocking by providing sufficient hardware resources. (SONET is the North American equivalent of the SDH transmission standard; a reference here to SDH is intended to be a reference to either SDH or SONET.) For example, a three-stage Clos-type switching structure is made non-blocking by providing at least a certain minimum number of middle stage switches. The cost of a switch is proportional to the number of middle stage switches.

Reducing the number of middle switches in the architecture increases the blocking probability. However, if a new connection is initially blocked, it may sometimes be completed by rearranging existing connections. A rearrangement is not allowed to interrupt existing connections. A factor that makes rearranging connections difficult in an SDH signal environment is the multirate and multicast nature of SDH signals.

The 155,520 kbit/s Synchronous Transport Module-1 (STM-1) is the basic building block in an SDH network. An STM-1 signal consists of overhead and payload bytes organized in a 125 microsecond frame structure. The information is conditioned for serial transmission on the selected media (e.g. optical fiber) at a rate synchronized to the network. At each network node where the signal is demultiplexed, information is processed byte-by-byte.

The STM-1 signal uses a so-called Virtual Container (VC)—an information structure defined by the International Telecommunications Union (ITU)—to serve various Plesiochronous Digital Hierarchy (PDH) data rates. There are several different-capacity virtual containers: a VC-4 signal can transport 139,264 kbit/s; a VC-3 signal can transport either 44,736 kbit/s or 34,368 kbit/s; a VC-2 signal can transport 6,312 kbit/s; and a VC-12 signal can transport 2,048 kbit/s. An STM-1 signal may contain various combinations of different virtual containers, such as a single VC-4, or three VC-3s, or two VC-3s and seven VC-2s. It is perhaps fruitful to liken virtual containers to Russian nesting dolls, to imagine that in an STM-1 signal, lower-capacity virtual containers may be "nested" in larger-capacity virtual containers.

Existing SDH Digital Cross-Connect Systems (DCSs) are usually non-blocking or nearly non-blocking, made so by using complex hardware. One kind of architecture often used for such a DCS is a three-stage Clos-type network, made up of three interconnected switching stages: an input stage, middle stage, and output stage.

In a general SDH network environment, a cross-connect switching system makes connections that differ in three categories.

Unicast or multicast. A unicast connection supports traffic between two endpoints, while a multicast connection supports traffic from one endpoint to a group of endpoints.

Unidirectional or bidirectional. In a unidirectional connection, data flows in only one direction: from a source to one or more destinations. In a bidirectional connection, both endpoints serve as both sources and destinations. Multicast connections can only be unidirectional. Bidirectional unicast traffic appears at a switch as two connections, one for each direction.

Protected or not protected. In SubNetwork Connection Protection (SNCP), unicast data is sent simultaneously on two disjoint paths. If one of the paths degrades or fails, the data may still be correctly received on the other path. For generality, the point at which the connection splits into two streams or joins back into a single stream can occur within the network and is not restricted to the endpoints. Thus, the connection consists of concatenated segments of single streams and disjoint paths. SNCP connections appear at the switch in one of two forms. If the switch is at a split point, then it must support a connection from one input to two outputs. If the switch is at a merge point, then it must support a connection from two inputs to one output. Some further constraints exist regarding the timing relationship between the two streams, such as that the two streams must be synchronized to allow merging to occur properly.

Each stage in a three-stage SDH switching network may have either time, space, or both time and space switching capabilities. An SDH signal is basically time division multiplexing at a byte level. Repositioning virtual containers in the same STM-1 payload is time switching. Moving virtual containers from one STM-1 payload to another is space switching.

Several algorithms for rearranging Clos networks are known, e.g., a routing algorithm for rearranging three-stage Clos networks for single-rate unicast traffic. The most relevant existing algorithm for rearranging Clos networks is Paull's change algorithm. See M. C. Paull, *Reswitching of Connection Networks*, Bell Syst. Tech. J., vol. 41, pp 833–855, May 1962. In Paull's change algorithm, when the input requested is in input switch I, and the output requested is in output switch O, the algorithm searches for a middle switch m available for the connection request. Sometimes the link from input switch I to middle switch m, and the link from output switch O to middle switch m are free at the same time. Then no rearrangements of existing connections are required.

If there is no middle switch m found, then a rearrangement is necessary. The rearrangement procedure uses two middle switches, A and B, where A is one of the middle switches that is free (unused) from input switch I to a middle stage, but is not free from output switch O to the same middle stage. B is one of the middle switches that is free from output switch O to the middle stage but is not free from input switch I to the middle stage. Freeing up bandwidth through middle switch A or B is possible by swapping some existing connections using middle switch A or B.

The existing procedures work only for single-rate unicast traffic, and do not work with multirate SDH switching. It is not possible to directly modify or extend Paull's change algorithm or any other known algorithm to work with SDH switching. SNCP, a new ITU standardized capability, cannot be implemented inside of existing switching procedures. The SDH multirate signal hierarchy in combination with multicast requirements forecasted in SDH networks do not allow existing procedures to be used. Hardware costs motivate a move toward more complexity in the switching procedure. Desired connection capabilities of SDH unicast unidirectional, unicast bidirectional, unicast unidirectional SNCP, unicast bidirectional SNCP, and multicast render existing procedures highly inefficient or non-functional.

SUMMARY OF THE INVENTION

The present invention is a procedure for making a new connection in a SONET/SDH digital cross-connect system when no free path through the switching hardware is available, by rearranging existing connections. This switching procedure looks for a path that provides the needed payload capacity for the requested connection, while requiring the least rearrangement of existing connections. All existing payload traffic continues through the digital cross-connect during the rearrangement.

The present invention is intended for use where there are insufficient middle switches in the cross-connect to make it non-blocking. In making new connections, the present invention rearranges existing connections without interrupting existing connections (hitless operation), and uses less hardware than existing rearrangement procedures require for the same non-blocking capability. Hitless operation is possible when one middle switch is reserved for rearrangement.

It is an object of the present invention to incorporate SNCP functionality into a procedure for SDH (and SONET) switching. Another object of the present invention is to switch as one intact signal structure the various hierarchical data structures of the SDH protocols, thus avoiding having to perform 63 independent switching actions on a VC-4 payload, 21 on a VC-3 payload, and 3 on a VC-2 payload. Another object is to prescribe how to rearrange connections in switching hardware with more than three stages.

When a new connection is requested, a search is made to see if there is an available path through the switch. This path hunt is a search for a group of consecutive switching slots that can pass the connection from the requested inputs on the switch to the requested outputs. VC-4, VC-3, VC-2, and VC-12 connections require 63, 21, 3, 1 consecutive time slots, respectively. An alternative to using a group of consecutive slots would be to allow fragmenting the slots, but this is not possible for switching in an SNCP enviromnent, because SNCP requires an intact comparison of the entire signal in the middle stage. So the present invention avoids fragmenting slots.

To represent the SDH signal hierarchy, it must be possible to represent all possible legal (properly nested) combinations of payloads in a single STM-1 link. An STM-1 signal can accept one VC-4, three VC-3s, twenty-one VC-2s, sixty-three VC-12s or any legal combination of those four virtual containers yielding the capacity of one STM-1. To represent the particular combination of virtual containers, i.e., to indicate which time slots are used, an STM-1 signal uses a data structure that includes 63 separate storage locations.

Instead of the usual 63 storage locations, the present invention uses a hierarchical storage method with a hierarchical data structure having 88 storage locations. Location 0 is reserved to indicate whether the STM-1 signal is being used as a VC-4 entity; locations 1, 2, and 3 are for VC-3s; locations 4 through 24 are for VC-2s; and locations 25 through 87 are for VC-12s. Each of the 88 locations contains a value that represents whether the location is used, not used, or hierarchically used, which means that a larger bandwidth signal, such as a VC-4, is using the bandwidth so that no smaller capacity signal may use it.

If a lower level channel $C_l$ is a member of a higher level channel $C_h$, then $C_l$ is said to be under $C_h$. For example, VC-12 channel 25 is under VC-2 channel 4, which is under VC-3 channel 1, which is under VC-4 channel 0.

The present invention always begins with a search for a new connection path that does not require rearranging existing connections. The particular combination of VCs making up the new STM-1 signal influences where the procedure begins this initial search. When a new connection is a VC-4 or a VC-3 signal, the search starts at middle switch 0, and moves progressively toward higher numbered middle switches. This procedure continues until a solution is found, or all middle switches up to and including m−1 have been considered. When a new connection is a VC-2 or a VC-12 signal, the search starts at middle switch m−1 and moves progressively toward lower numbered middle switches. If no solution is found, the rearrangement procedure is used to look for a solution.

The rearrangement procedure, called the Hierarchical Path Hunt with Rearrangement Algorithm (HPHRA), finds and frees a middle switch A and channel C to allow the new connection. The channel C through middle switch A is denoted A.C. The connections using blocked channels under C are queued. The connections using channels in the queue $(A.C_{A1}, A.C_{A2}, A.C_{A3}, \ldots, A.C_{Ak})$ must be freed. The procedure needs to find a middle switch B and hierarchy channel $C_{B1}$ denoted $B.C_{B1}$ to free $A.C_{A1}$ in the queue. To find $B.C_{B1}$, first the connection using $A.C_{A1}$ is found. Then, if an available channel exists that can take the connection, the existing connection is moved to $B.C_{B1}$. In this case, only one rearrangement of $A.C_{A1}$ to $B.C_{B1}$ is required to free $A.C_{A1}$.

If the procedure cannot find a channel $B.C_{B1}$ (which is more likely in a more heavily loaded cross-connect), then the channel having the largest available bandwidth, even though it is not sufficient, is used for $B.C_{B1}$. In this case, it is possible to need more than one rearrangement in order to make $A.C_{A1}$ available for the new connection. Several connections using the channels under $B.C_{B1}$ must be rearranged so that $B.C_{B1}$ is completely empty, allowing the existing connection on $A.C_{A1}$ to be moved into $B.C_{B1}$.

For example, suppose the procedure is searching for an available path for the conflicting connection using channel $B.C_a$ under $B.C_{B1}$. Assume the available path is through $D.C_a$. Simply moving the connection from $B.C_a$ to $D.C_a$ can make $B.C_a$ free. If no such available channel exists, then the existing connection on $A.C_{A1}$ is moved to $B.C_{B1}$, and the used channels under $B.C_{B1}$ are moved to $A.C_{A1}$.

Next, the conflicting connection using channel $A.C_a$ under $A.C_{A1}$ is swapped with $B.C_b$ under $B.C_{B1}$ by using a proper one-to-one mapping between all channels under $A.C_{A1}$ and all channels under $B.C_{B1}$. The pairs $(A.C_{Ai}, B.C_{Bi})$, where $i=1, 2, 3, \ldots, k$, are found and rearranged until the queue is empty, i.e., until the channels $A.C_{A1}, A.C_{A2}, A.C_{A3}, \ldots, A.C_{Ak}$ are all freed. Then A.C is free, and the new connection can be made through middle switch A and channel C.

Another object of the present invention is to provide switching service by rearrangement for five kinds of SDH connection: unicast unidirectional with and without SNCP, unicast bidirectional with and without SNCP, and multicast. Still another object of the present invention is to provide switching service by rearrangement for various SDH switching architectures, including a three-stage switch that has both time (T) and space (S) switching capabilities in the first and third stages, and only SNCP selection and space switching in the middle stage: a TS-S-TS switching network.

BRIEF DESCRIPTION OF THE DRAWINGS

The above objects and also other objects, advantages and features of the invention will become apparent from the following description, taken in conjunction with the accompanying drawings, which illustrate specific embodiments of the invention. In the drawings.

DESCRIPTION OF THE PREFERRED EMBODIMENT

Figure 1:
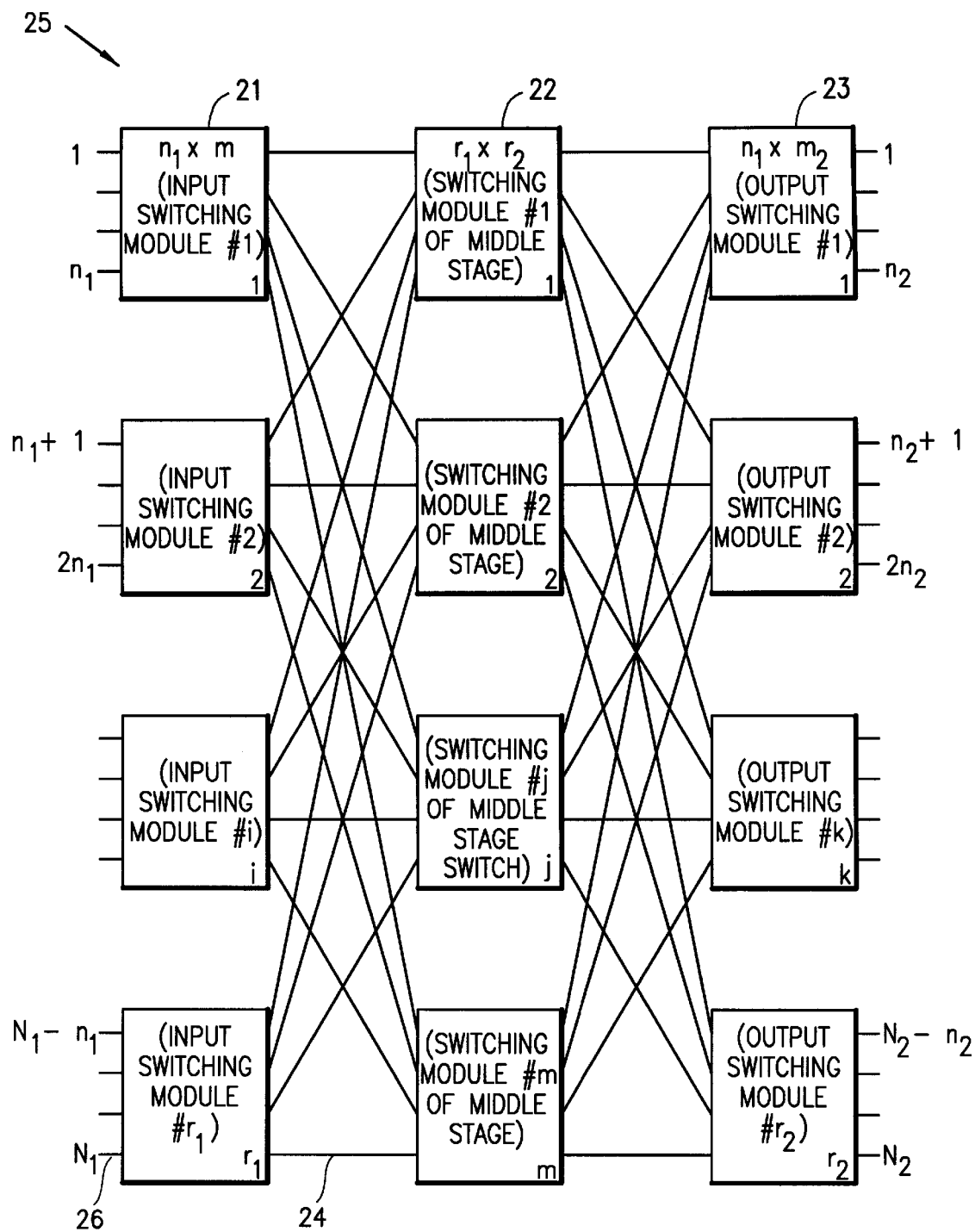
FIG. 1 shows a three-stage Clos network, which is prior art.

Referring now to FIG. 1, a three-stage Clos network with $N_1$ inlets and $N_2$ outlets is shown. Each switching module 21 of the first stage, which comprises the first column of switching modules, has $n_1$ inputs and m outputs, while each switching module 23 in the third stage has m inputs and $n_2$ outputs. The switching modules 21 and 23 are also called simply input and output switches, and the entire digital cross-connect system 25 is sometimes called simply a switch. The number of input switches, $r_1$, and the number of output switches, $r_2$, are given by the equations: $r_1=N_1/n_1$, and $r_2=N_2/n_2$.

There is exactly one link 24 connecting each input switch 21 to each middle switch 22, and exactly one link connecting each middle switch 22 to each output switch 23. The network has $r_1$ input switches, m of the $r_1 \times r_2$ middle switches, and $r_2$ output switches. This type of network is denoted by $v(m, n_1, r_1, n_2, r_2)$. If the network is symmetrical, $n=n_1=n_2$, $r=r_1=r_2$, and $n_r=N$. A symmetrical network is denoted by the reduced notation $v(m, n, r)$.

Each switching module also has various input and output ports. For example, switch $r_1$ of the first stage has an input port 26 and output port 24 (which is also an input port for the middle switch m). From the view of the present invention, determining which ports to use is not necessary, because each switching module is built to automatically connect input ports to output ports to meet the higher-level supervision provided, for example, by the present invention. Thus, the present invention is not concerned with determining what input ports to connect to what output ports across a switching module 21 or 23, but it is concerned with which input ports (and time slots) to connect across to output ports on switching module 22.

Figure 2:
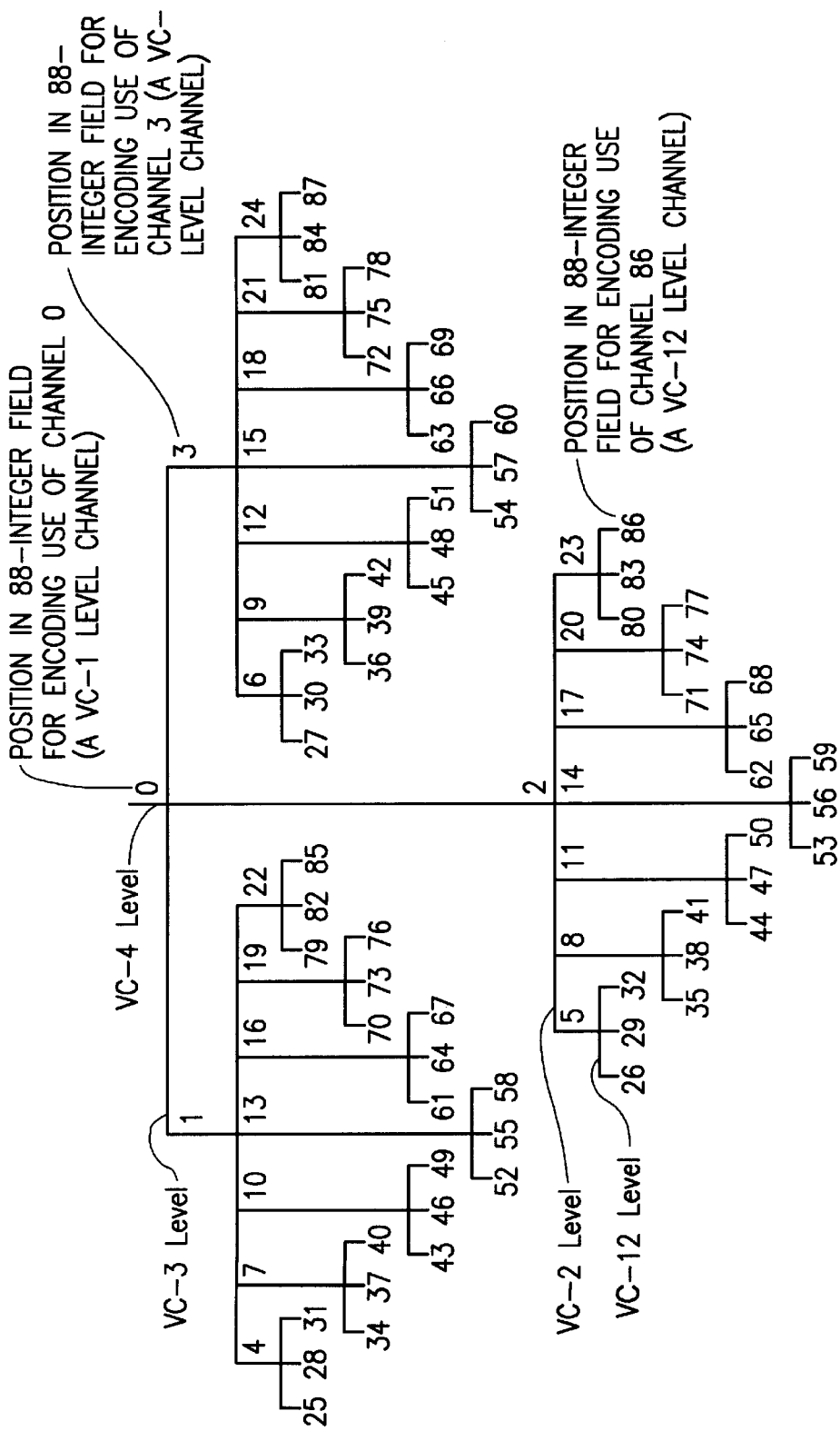
FIG. 2 shows the hierarchical signal levels of an STM-1 signal according to the present invention.

The encoding of an STM-1 signal according to the present invention is shown in FIG. 2. In this 88-byte wide representation, each byte has a value that indicates whether the corresponding time slot is used, not used, or hierarchically used. If a byte other than the byte at location 0 is indicated as being used hierarchically, then a larger bandwidth signal is using the location. For example, the byte at location 0 indicates whether the bytes are to be regarded collectively as a VC-4 level entity (highest capacity payload); and the byte at location 2 indicates whether all of the bytes hierarchically under byte 2 are to be regarded as a single VC-3 level entity.

Figure 3:
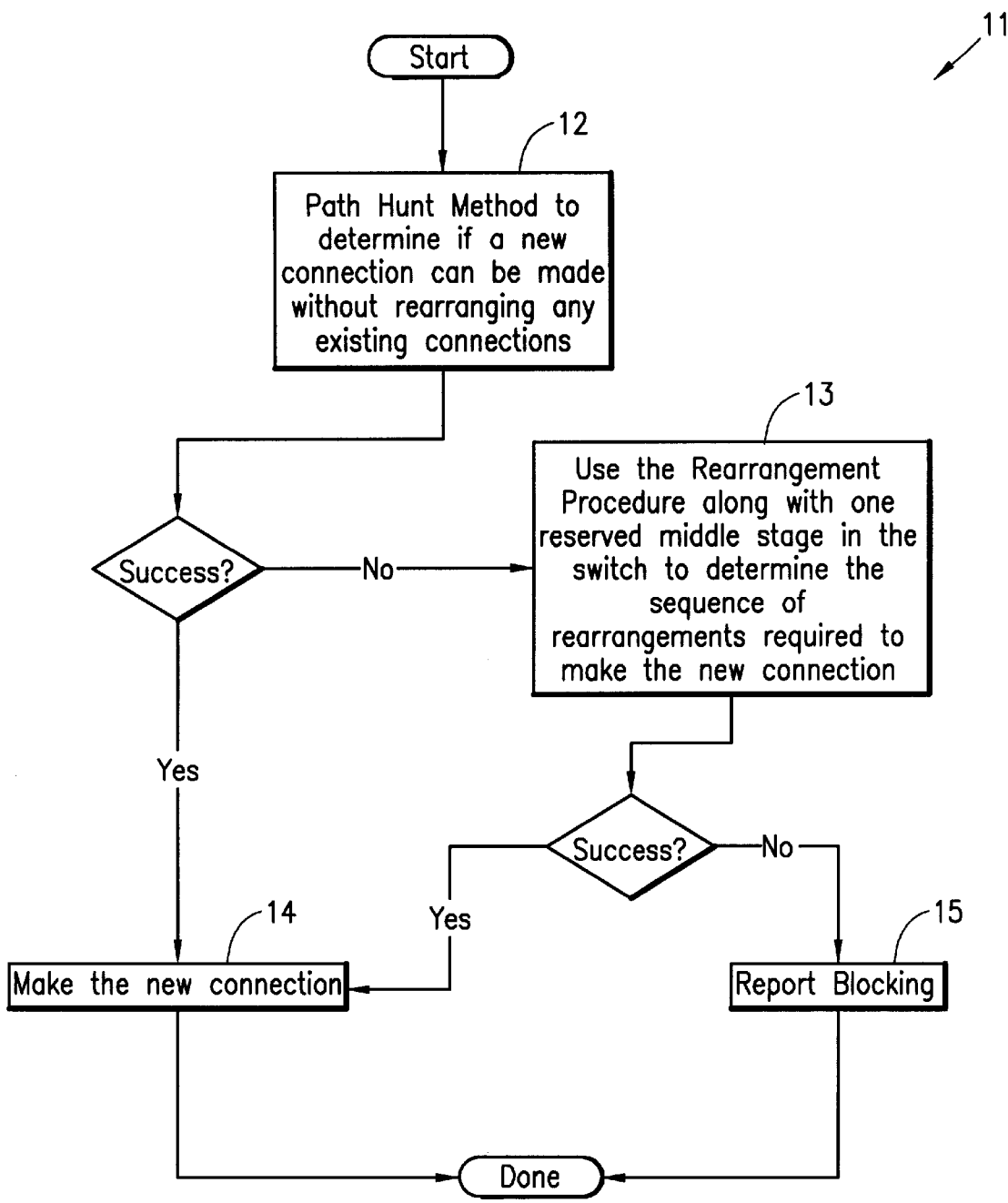
FIG. 3 is a high-level flow-chart of the overall path hunt and rearrangement procedure according to the present invention.

The overall cross-connect procedure 11 of the present invention is shown in FIG. 3. If a new connection request cannot find an available path through the cross-connect by using the path hunt procedure 12, which is shown in more detail in FIG. 4, an attempt to rearrange existing connections must be made. The rearrangement process 13, which is represented in pseudo-code below, moves some existing connections so that the new connection can be made.

Figure 4:
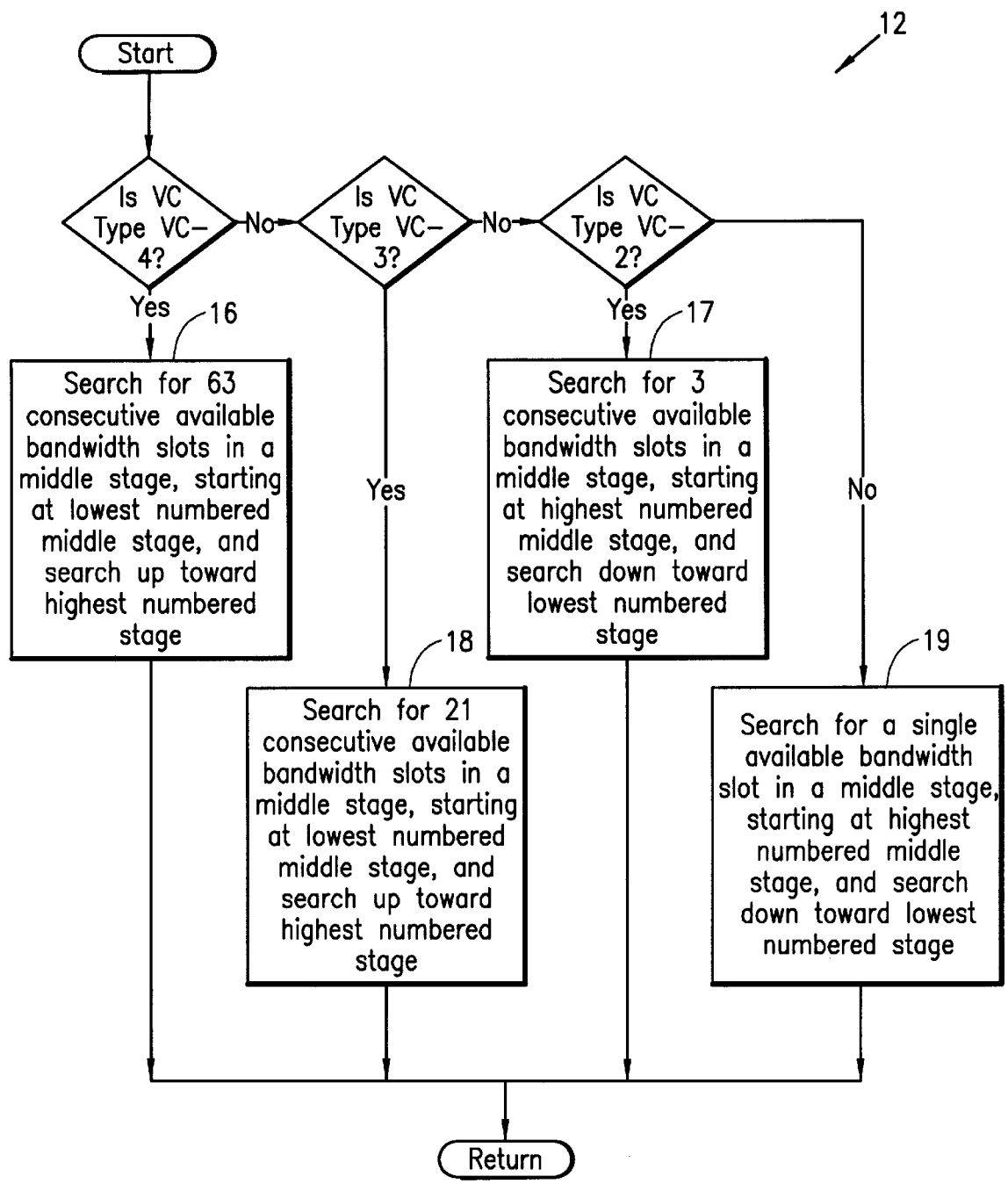
FIG. 4 is a more detailed flow-chart of the path hunt procedure according to the present invention.

Referring now to FIG. 4, the path hunt method 12 uses one of four procedures 16, 17, 18, or 19, depending on the level of the virtual container for which a new connection is needed. If the path hunt succeeds, then no rearrangement is required to service the new connection request, and the overall procedure 11 (see FIG. 3) directs, in process 14, that the found connection be made. Otherwise, the rearrangement procedure 13, disclosed below as pseudo-code, is used. If either the rearrangement procedure 13 or the path hunt method 12 is successful, a new connection is made through process 14. If a path cannot be found even through rearrangement, the overall procedure 11 reports blocking, through process 15.

The present invention organizes procedures for finding an available path into three algorithms—Hierarchy Path Hunt with Rearrangement Algorithms (HPHRA) I, II, and III—differing in the kinds of connection they provide. In the final rearrangement procedure, one of the three HPHRA algorithms is used to provide the needed connection. HPHRA-I handles the signal hierarchy for unicast connections only. HPHRA-II handles unicast and multicast connections. HPHRA-III provides the same path finding as HPHRA-II, but in the context of SNCP connections.

HPHRA-I finds a middle switch A and channel C to free for the new connection. The hierarchical channel C must be of the same VC-type capacity as the connection request. The channel C through middle switch A is denoted as A.C. The connections using the channels that are under C and are not free are queued. The channels in the queue (A.$C_{A1}$, A.$C_{A2}$, A.$C_{A3}$, . . . , A.$C_{Ak}$) must be freed.

For A.$C_{A1}$ in the queue, the procedure needs to find a middle switch B and hierarchy channel $C_{B1}$, denoted as B.$C_{B1}$. To find it, first the connection using A.$C_{A1}$ is found, and if an available channel that can take the connection in the current state exists, the channel becomes B.$C_{B1}$. In this case, only one rearrangement of A.$C_{A1}$ to B.$C_{B1}$ is required to make A.$C_{A1}$ free. If the procedure cannot find such a channel, then the channel that has the largest available bandwidth (even though it is not enough) becomes B.$C_{B1}$. In this case, it is possible to need more than one rearrangement to free A.$C_{A1}$.

Some connections using the channels under A.$C_{A1}$ and some connections using the channels under B.$C_{B1}$ in the current state must be rearranged so that A.$C_{A1}$ is freed. The conflicting channel A.$C_a$ under A.$C_{A1}$ is swapped with B.$C_b$ under B.$C_{B1}$ by using a proper one-to-one mapping between all channels under A.$C_{A1}$ and all channels under B.$C_{B1}$. The pairs (A.$C_{Ai}$, B.$C_{Bi}$), where i=1, 2, 3, . . . , k, are found and rearranged until the queue is empty. Then A.$C_{A1}$, A.$C_{A2}$, A.$C_{A3}$, . . . , A.$C_{Ak}$ are all free, so that A.C is free, and the new connection can be made through middle switch A and channel C.

To prevent extremely long searches, a maximum allowable rearrangement length is specified. The rearrangement length is defined as the number of swappings in the rearrangement process. If the current rearrangement length exceeds the maximum, then this trial is abandoned and another is attempted.

Usually more than one A.C is found for the rearrangement process. The A.C are sorted by the availability of bandwidth. The rearrangement process uses the A.C one-by-one until the trials using different A.C exceeds the allowed number of trials.

HPHRA-I can also handle a bidirectional unicast connection, since that can be considered two individual unicast connections in an SDH cross-connect. To do this, HPHRA-I is applied in turn to each unicast connection that makes up the bidirectional unicast connection. If one of the two unicast connections in the bidirectional unicast connection is blocked, the entire bidirectional unicast connection is considered blocked.

The rearrangement procedure that is the present invention can be expressed in high-level pseudo-code using the following variable definitions:
I: the input switch which includes the input port requested;
O: the output switches which include the output port destinations;
$F_r(I)$: the set of all free A.Cs in row I, where C is a channel in the same level of the traffic type (VC-4/3/2/12) of the connection requested; and
$F_c(J)$: the set of all free A.Cs in column J, where C is a channel in the same level of the traffic type (VC-4/3/2/12) of the connection requested.

In the pseudo-code, the notation I∩O is used in the usual way, to represent the intersection of the two sets I and O. In particular, the pseudo-code uses the expression $$F_r(I) \cap F_c(O)$$

to represent all available paths entering from the input switch I (which in a two-dimensional representation of the switching problem would be a certain row), passing through the middle stage, and emerging from the output switch O (which in a two-dimensional representation of the switching problem would be a certain column).

HPHRA-I can be expressed in high-level pseudo-code.
Procedure HPHRA-I;
Step 1;
  Read connection/disconnection request;
Step 2;
  If disconnection is requested
    Go to Step 5;
  If connection is requested
  If connection type is unidirectional unicast
    Go to Step 3;
    If A.C is found {Comment: rearrangement process is successful}
      Go to Step 5;
    Else {Comment: rearrangement process is unsuccessful}
      Report Blocking;
      Go to Step 1;
  If connection type is bidirectional unicast
    {Comment: the first unicast of the bidirectional unicast connection}
    Go to Step 3;
    If A.C is found
    {Comment: rearrangement process of the first unicast is successful}
      Establish the first unicast connection;
      {Comment: now, the second unicast of the bidirectional unicast}
      Go to Step 3;
      If A.C is found
        {Comment: rearrangement process of the second is successful}
          Go to Step 5;
        Else
        {Comment: rearrangement process of the second is unsuccessful}
          Remove the first unicast connection;
          Report Blocking;
          Go to Step 1;
    Else
    {Comment: rearrangement process of the first unicast is unsuccessful}
      Report Blocking;
      Go to Step 1;
Step 3;
  Evaluate $F_r(I) \cap F_c(O)$
  If $F_r(I) \cap F_c(O)$ is NOT empty;
    A.C←Pick one in $F_r(I) \cap F_c(O)$;
    {Comment: packing method is used to find A.C}
  Else
    Go Rearrangement_Unicast;
Step 4;
  If Rearrangement_Unicast is successful
    {Comment: the intersection is not empty now}
    Go to Step 3;
  Else
    Go to Step 2;
Step 5;
  Establish connection/disconnection;
  Go to Step 2;
End HPHRA-I.
Rearrangement_Unicast;
{Comment: this procedure tries to make A.C free}
Step 1;
  Find MAXX.Ys that have the MAX largest values in $|F_r(I) \cap F_c(O)|$;
  {Comment: MAX is the maximum number of A.Cs that will be tried}
  Sort X.Ys by the availability of bandwidth;
  While MAX>0
    A.C←first element of sorted X.Ys;
    Go to Step 2;
    If rearrangement is successful
      Return REARRANGED;
    Else
      Decrement MAX;
  Return BLOCKED;
  {Comment: the set of X.Ys is exhausted, and the rearrangement is still unsuccessful}
Step 2;
  Do Rearrangement_Row for I;
  If Rearrangement_Row is successful
  Do Rearrangement_Column for O;
  If Rearrangement_Column is successful
    Report rearrangement is successful;
  Else
    {Comment: rearrangement for column was not successful}
    Report rearrangement failure;
  Else {Comment: rearrangement for row was not successful}
    Report rearrangement failure;
    Go to Step 1;
End Rearrangement_Unicast.
Rearrangement_Row/Rearrangement_Column;
    {Comment: this part will be finished when two queues, Needed_Channels_Q and SWAP_Q are empty. Needed_Channels_Q has channels that are supposed to be free and SWAP_Q has rows and columns that will have to be visited to free the hierarchical channels in queue Needed_Channels_Q.}
Step 1;
    If Rearrangement_Row
        Put all channels (A.$C_{Ak}$), k=1, 2, 3, . . . that are under A.C and currently used in row I, in queue Needed_Channels_Q;
    If Rearrangement_Column
        Put all channels (A.$C_{Ak}$), k=1, 2, 3, . . . , that are under A.C and currently used in column O, in queue Needed_Channels_Q;
Step 2;
    If Needed_Channels_Q is empty
        Go to Step 6;
    Else
        A.$C_A$←first element of Needed_Channels_Q;
        Remove the first element of Needed_Channels_Q;
        If number of swapped connections exceeds maximum rearrangement lengths
            {Comment: blocking decision is made here}
            Report Blocking;
            Go to Step 7;
        Else
            Find B.$C_B$;
Step 3;
    If A.$C_A$ is a fully available channel for swapping
        Move the connection using A.$C_A$ with B.$C_B$;
    Else
        Locate the connection using A.$C_A$;
        Put the location in queue SWAP_Q;
Step 4;
    If queue SWAP_Q is empty
        Go to step 2;
    Else
        ROW←The row having A.$C_A$ in the first element of SWAP_Q;
        COL←The column having A.$C_A$ in the first element of SWAP_Q;
        {Comment: connection in the first element of SWAP_Q}
        Remove the first element of SWAP_Q;
Step 5;
    For all rows
        For all channels
            If a connection containing A.$C_a$ in COL that is under A.$C_A$ exists
                Find B.$C_b$;
                If B.$C_b$ is fully available
                    Move the connection using A.$C_a$ to B.$C_b$;
                    {Comment: no ripple effect will occur}
                Else
                    Move the connection A.$C_a$ to B.$C_b$;
                    Locate A.$C_a$;
                    {Comment: find ROW and COL for A.$C_a$}
                    Put the location in SWAP_Q;
                    {Comment: ripple effect is expected. The conflicting channel is queued in SWAP_Q.}
    For all columns
        For all channels
            If a connection containing A.$C_a$ in ROW that is under A.$C_A$ exists
                Find B.$C_b$;
                If B.$C_b$ is fully available
                    Move the connection using A.$C_a$ to B.$C_b$;
                    {Comment: no ripple effect will occur}
                Else
                    Move the connection A.$C_a$ to B.$C_b$;
                    Locate A.$C_a$;
                    {Comment: find ROW and COL for A.$C_a$}
                    Put the location in SWAP_Q;
                    {Comment: ripple effect is expected. The conflicting channel is queued in SWAP_Q.}
    Go to Step 4;
Step 6;
    Return that the rearrangement process is successful;
Step 7;
    Return that the rearrangement process has failed;
End Rearrangement_Row/Rearrangement_Column.

Since the unicast connection type is a special case of the multicast connection type, a rearrangement algorithm that can handle the multicast connection type will also handle the unicast connection type. The HPHRA-II procedure can handle unidirectional unicast, bidirectional unicast, and multicast connection types.

The idea of HPHRA-II is based on applying HPHRA-I recursively to all output switches that are destinations. A multicast connection type is defined as a connection with a single source and at least two destinations. Sometimes more than one port destination is included in the same output switch, and this connection is also considered a multicast connection type, even though only one output switch is involved.

In HPHRA-II, the middle switch A and the channel C are selected by finding the combination that has the greatest free bandwidth between the input switch and all the output switches involved. Step 1 in the procedure Rearrangement_Multicast of the pseudo-code for HRHPA-II finds this A.C. If there is no A.C between the input switch and all output switches involved, the entire multicast connection is considered blocked.

In terms of pseudo-code, the HPHRA-II is shown below.
Procedure HPHRA-II;
Step 1;
    Read connection/disconnection request;
Step 2;
    If disconnection is requested
        Go to Step 5;
    If connection is requested
        If connection type is multicast
            {Comment: unicast is considered as a multicast connection with only one output.}
            Goto Step 3;
            If A.C is found comment: rearrangement process is successful
                Go to Step 5;
            Else {Comment: rearrangement process is unsuccessful}
                Report Blocking;
                Go to Step 1;
        If connection type is unidirectional unicast
            Go to Step 3;
            {Comment: l=1 for a unicast connection}

If A.C is found {Comment: rearrangement process is successful}
  Go to Step 5;
Else {Comment: rearrangement process is unsuccessful}
  Report Blocking;
  Go to Step 1;
If connection type is bidirectional unicast
  {Comment: the first unicast of the bidirectional unicast connection}
  Go to Step 3;
  If A.C is found;
  {Comment: rearrangement process for the first unicast is successful}
    Establish the first unicast connection;
    {Comment: the second unicast of the bidirectional unicast}
    Go to Step 3;
    If A.C is found;
    {Comment: rearrangement process for the second is successful}
      Go to Step 5;
    Else
      {Comment: rearrangement process of the second is unsuccessful}
      Remove the first unicast connection;
      Report Blocking;
      Go to Step 1;
  Else
    {Comment: rearrangement process of the first unicast is unsuccessful}
    Report Blocking;
    Go to Step 1;
Step 3;
  Evaluate $F_r(I) \cap F_c(O_k)$ for all k=1, 2, 3, . . . , l where l is the number of output switches in the destinations;
  If $F_r(I) \cap F_c(O_k)$ is NOT empty
    A.C←Pick one in $F_r(I) \cap F_c(O_k)$;
    {Comment: packing method is used to find A.C}
    Go to Step 5;
  Else
    {Comment: The intersection is empty}
    Go Rearrangement_Multicast;
Step 4;
  If rearrangement process is successful
    {Comment: the intersection is not empty now}
    Go to Step 3;
  Else
    Go to Step 2;
Step 5;
  Establish connection/disconnection;
  Go to Step 2;
End HPHRA-II.
Rearrangement_Multicast;
Step 1;
  Find A.C which has the largest value in $|F_r(I) \cap F_c(O_k)|$ where k=1, 2, 3, . . . , l.;
  {Comment: l is the number of output switches involved in the destination.}
Step 2;
  Do Rearrangement_Row for I;
  {Comment: Rearrangement_Row is in HPHRA-I}
  If Rearrangement_Row is successful
    k=1;
    While (k<l+1)
      Do Rearrangement_Column for $O_k$;
      {Comment: Rearrangement_Column is in HPHRA-I}
      If Rearrangement_Column is successful
        Increment k;
      Else
        {Comment: rearrangement process has failed}
        k=l+1;
      If Rearrangement_Column for all output switches involved in the destination is successful
        Return rearrangement is successful;
      Else
        {Comment: rearrangement for the column(s) was not successful}
        Return rearrangement failure;
  Else
    {Comment: Rearrangement_Row for I has failed}
    Return rearrangement failure;
End Rearrangement_Multicast.

To provide SNCP service, unicast data can be sent simultaneously on two disjoint paths. If one path experiences failure, the data may still be received correctly on the other path. For generality, the point at which the connection splits into two copies or joins back into a single copy can occur anywhere within the network.

SNCP connections appear at the switch in one of two forms. If the switch is at a split point, then it must support a connection from one input to two outputs. If the switch is at a merge point, then it must support a connection from two inputs to one output. The merge of the two copies occurs in the middle stage switch. This means the two copies are compared in the middle switch. After the comparison, one copy, which is usually free from errors, is chosen and proceeds to an output stage switch. The inverse procedure, the splitting (copying) also occurs in the middle stage switch. The two copies are connected to output stage destinations. No comparison of the two copies is made in the splitting operation.

To make building hardware practical, some further constraints are imposed regarding the timing relationship between the two copies. There are three cases allowed in the timing relationships. Case 1 uses the same channel n (but different input stage switch to middle stage switch connection) for the two copies A and B. Case 2 and case 3 use different channels for the two copies, but the channels used must be adjacent to each other.

In a three-stage Clos network, two input ports and one output port are involved in making a 2×1 SNCP connection. The input switches with the input ports involved in the switching are represented by $I_1$ and $I_2$. If the input ports involved are on the same input switch, then $I_1$ is equal to $I_2$. Then, case 1 is invalid, because the two copies cannot share the same channel. The output switch O contains the output port involved in the 2×1 SNCP connection.

Case 1 means that the link between input switch $I_1$ and a middle switch M, the link between $I_2$ and the middle switch M, and the link between the middle switch M and output switch O use the same channel n for a connection. If the link between input switch $I_1$ and middle switch M uses n and the link between input switch $I_2$ and middle switch M uses n+1 for the connection, the connection corresponds to a case 2 type timing relationship. If the link between input switch $I_1$ and middle switch M uses n+1 and the link between input switch $I_2$ and middle switch M uses n, the connection corresponds to a case 3 type timing relationship. These are the case classifications used in HPHRA-III.

HPHRA-I and HPHRA-II do not have rearrangement capability for 2×1 SNCP connections. The 1×2 SNCP connection can be handled by HPHRA-II, because the connection can be treated as a 1×2 multicast connection. There is no difference between the 1×2 SNCP connection type and a 1×2 multicast connection type if the legs branch out in the middle stage switch. However, since the 2×1 SNCP connections have a different format, the previous rearrangement algorithm cannot handle the 2×1 SNCP connection types. The two input ports should be connected to the same middle switch so that the two copies can be compared. Furthermore, to build practical hardware, allowable channel usages must be organized into the three cases described above. The choice of timing among the three different cases is applied to both the path hunt and the rearrangement process.

In terms of pseudo-code, the overall procedure for the Hierarchical Path Hunt with Rearrangement for SNCP (HPHRA-III) is as shown below.

Procedure HPHRA-III;
Step 1;
   Read connection/disconnection request;
Step 2;
   If connection is requested
      If connection type is multicast, unidirectional unicast, bidirectional unicast,
      1×2 SNCP
         Use HPHRA-II;
      If connection type is SNCP 2×1
         Use Rearrangement_2×1_SNCP;
      If connection type is bidirectional SNCP connection
         Use HPHRA-I for 1×2 SNCP connection;
         If successful
            Go to Rearrangement_2×1_SNCP;
         If NOT successful
            Remove the 1×2 SNCP connection;
End HPHRA-III.

Rearrangement_2×1_SNCP,
   Comment: the rearrangement of SNCP follows the trials in order. If the current trial is completed successfully, then the algorithm stops and reports the rearrangement is successful. Otherwise the next trial will be attempted. If all trials failed, blocking is reported.;
Step 1;
   While trials are not exhausted and the current trial has failed
      If Trial 1
         Find A.C which has the most available bandwidth in $I_1 \cap I_2 \cap O$;
      If Trial 2 or Trial 3
         Find A.C which has the most available bandwidth in $I_1 \cap O$;
      If Trial 4 or Trial 5
         Find A.C which has the most available bandwidth in $I_2 \cap O$;
      {Comment: A.C is the desired channel for rearrangement process for 2×1 SNCP}
      Go to Step 2;
   If rearrangements are successful
      Report REARRANGED;
   Else
      Report BLOCKED;
Step 2;
   If Trial 1 or Trial 2 or Trial 4
      Rearrangement_Row for $I_1$ with A.C;
      If successful
         Rearrangement_Row for $I_2$ with A.C;
         If successful
            Rearrangement_Column for O with A.C;
   If Trial 3
      Rearrangement_Row for $I_1$ with A.C;
      If successful
         Rearrangement_Row for $I_2$ with A.C+1;
         If successful
            Rearrangement_Column for O with A.C;
   If Trial 5
      Rearrangement_Row for $I_2$ with A.C;
      If successful
         Rearrangement_Row for $I_1$ with A.C+1;
         If successful
            Rearrangement_Column for O with A.C;
   Go to Step 1;
End Rearrangement_2×1_SNCP.

The five different trials shown in the procedure Rearrangement_2×1_SNCP above are explained below:

Trial 1: The middle switch A and channel C with the most available bandwidth in $I_1 \cap I_2 \cap O$ are found. After finding A.C, use rearrangement for row $I_1$ with the desired channel A.C. If successful, then the rearrangement for row $I_2$ is attempted with the same A.C. Rearrangement for the column is only attempted if the rearrangement for row $I_2$ is successful. If the rearrangements are completed, then channel C is free from the input switches $I_1$ and $I_2$ to output switch O through the middle switch A. The timing relationship of the channels used in the connection correspond to a case 1 type timing relationship.

Trial 2: Attempted only if trial 1 fails. In this trial, the middle switch A and channel C, which have the most available bandwidth in $I_1 \cap O$, is used. $I_2$ is not considered in selecting A.C. Except for the procedure for finding A.C, this trial is same as trial 1. The timing relationship is a case 1 type timing relationship.

Trial 3: Attempted only if trial 1 and trial 2 failed. The rearrangement for row $I_1$ tries to make A.C, which was found in trial 2, free. If successful, the rearrangement for row $I_2$ will try to make A.C+1 free. C+1 is the adjacent channel of C. The timing relationship of the channels used in this connection corresponds to a case 2 type timing relationship.

Trial 4: Attempted only if trial 1, 2, and 3 failed. A.C is the middle switch and channel which has the most available bandwidth in $I_2 \cap O$. $I_1$ is not considered in selecting A.C. Except for the procedure for finding A.C, this trial is same as trial 1 and 2. The timing relationship in this trial is a type timing case 1 relationship.

Trial 5: Attempted only if trail 1, 2, 3, and 4 failed. This trial is similar to Trial 3. Rearrangement for $I_1$ is attempted with A.C+1 and rearrangement for $I_2$ is attempted with A.C which was found in trial 4. The timing relationship is a case 3 type timing relationship.

Although the invention has been shown and described with respect to a best mode embodiment thereof, it should be understood by those skilled in the art that the foregoing and various other changes, omissions and additions in the form and detail thereof may be made therein without departing from the spirit and scope of the invention. The invention includes a cross-connect 25 embodying the above methodology.

Having now disclosed the invention, what is claimed is:

1. A method for finding a path for a composite signal through a switching matrix the switching matrix having only switching elements any of which are potentially available for use as part of a connection for the signal, the method for use even when all possible paths through the switching matrix are blocked, the signal requiring a certain bandwidth and so a certain fraction of the throughput capacity of the switching matrix, each of the possible paths constituting a set of connections from an input switch, through the switching matrix, to an output switch, the switching matrix carrying existing signals on existing paths created by having made existing connections, the method comprising the steps of:

1) searching for the path only among possible paths that do not require rearranging any existing connections, and, if the path is found, using the path for the new signal;
2) if the path is not found in step 1, picking as a target path a partially blocked possible path through the switching matrix, the partially blocked possible path blocked by some existing connections carrying some existing signals requiring less bandwidth than the new signal; and
3) finding a different path for each existing signal carried by existing connections of the target path by recursively applying steps 1–2, with each existing signal carried by existing connections of the target path treated, in turn, as the new signal in steps 1–2;

wherein the searching for the path considers only paths providing a bandwidth adequate for the signal without fragmenting the signal into components.

2. A method as claimed in claim 1, further comprising the step of:

4) repeating the recursive applying of step 3 for existing signals having progressively smaller bandwidth.

3. A method as clained in claim 2, further comprising the steps of:

5) stopping the recursive applying of step 3 for existing signals having progressively smaller bandwidth upon reaching an existing signal for which a target path cannot be found that is blocked by signals of even smaller bandwidth; and
6) repeatedly trying another possible path for the target path for the new signal, until all possible paths are exhausted.

4. A method for finding a path for a new composite signal through a switching matrix the switching matrix having only switching elements any of which are potentially available for use as part of a connection for the signal, even when all possible paths through the switching matrix are blocked, the signal consisting of consecutive frames, each frame consisting of consecutive slots, the switching matrix having an input stage array consisting of a plurality of input switches ($I_N$, where N=0, 1, ..., $r_1$), a middle stage array consisting of a plurality of middle switches ($M_1, M_2, ..., M_m$), and an output stage array consisting of a plurality of output switches ($O_N$, where N=0, 1, ..., $r_2$), and having existing connections for carrying existing signals, the new signal requiring a certain bandwidth, and arriving at input switch $I_x$ and destined for output switch $O_y$, the path for the new signal consisting of connections of selected slots across a selected middle switch from an input switch to an output switch, the method using one of the existing signals or the new signal as a desired signal for which connections are to be rearranged or made in finding the path for the new signal, and taking initially the new signal as the desired signal, the method comprising the steps of:

1) searching for a free path for the desired signal, and, if said free path is found, using said free path for the desired signal, but if said free path is not found, generating a list of possible paths from the paths already searched, sorted by how blocked each possible path is;

2) for each path in the list of possible paths, selecting as a target path ($I_x$, $M_zC$, $O_y$) the next least blocked path, the target path comprising a middle switch $M_z$ selected from the plurality of middle switches ($M_1, M_2, ..., M_m$) and a connecting channel C made up of slots some of which must be freed, said slots that make up the connecting channel C also making up channels hierarchically under the connecting channel, the channels hierarchically under the connecting channel being free or not free depending on whether the slots making them up are all free or not all free respectively;
3) queuing the channels that are hierarchically under the connecting channel C and that are not free; and
4) recursively applying steps 1–3 for each queued channel, so as to find another path for that queued channel wherein in searching for a free path and in generating a list of possible paths, only paths consisting of consecutive slots are considered.

5. A method as claimed in claim 4, wherein, in searching for a target path at some level of recursion below a first application of steps 1–3, each level of recursion having a target path, no path is considered for use as the target path if the path includes part of a target path at any higher level of recursion up to and including the first application of steps 1–3.

6. A method as claimed in claim 4, wherein the recursive applying of steps 1–3 is performed without disturbing existing connections by using a middle switch reserved for rearranging connections.

7. A method as claimed in claim 4, wherein a multirate signal, consisting of a plurality of time slots, which are used in various combinations to provide various rates of information transmission, is represented using a hierarchical structure that indicates whether a time slot of the signal is used, not used, or hierarchically used, thereby allowing all time slots in a level of the hierarchical structure to be switched to another path with one switching operation.

8. A method as claimed in claim 4, wherein, in determining the target path, only contiguous channels are considered, up to and including the number of channels required for the new connection.

9. A method as claimed in claim 4, wherein the search for the free path without rearrangement is performed by traversing the middle stage array in a direction depending on how much bandwidth is needed, so that even when multiple solutions exist, there is more efficient use of switching hardware.

10. A method as claimed in claim 4, wherein if the new signal needs a connection from an input switch to more than one output port, the search is made, according to steps 1–4, for a connection from the input switch to each output port constrained by a requirement that each connection pass through the same middle switch, and wherein the search producing a list of possible paths sorted in order of blocking is conducted by finding a combination of connections having the greatest free bandwidth between the input switch and all the output ports, thereby providing multicast connections even if existing connections must be rearranged.

11. A method as claimed in claim 4, wherein when a 1×2 SNCP connection is required for the new signal, the method further comprises the step of:

treating the 1×2 SNCP connection as a multicast connection constrained by a requirement that each connection of the multicast connection pass through the same middle switch, thereby allowing 1×2 SNCP connections with multicasting for multirate signals connected through the switching matrix.

12. A method as claimed in claim 4, wherein when a 2×1 SNCP connection is required, which designates two input sources, $I_1$ and $I_2$, each carrying a copy of the same new signal intended for the output destination O, the method further comprises the steps of:

finding two paths, one for the copy of the new signal from each input source $I_1$ and $I_2$, to the same middle switch of a target path, with a timing relationship in which the two paths use adjacent channels through the same middle switch, or, if the two input sources are ports on a different input switch, a timing relationship in which the two paths use the same channel or adjacent channels, and rearranging existing connections using five trials executed in turn, each of said five trials searching for a path for the new signal by rearranging as few existing connections as possible, while preserving the timing relationship between the two copies of the signal, the five trials comprising the steps of:

trial 1, searching for a first path and a second path, the first path from input source $I_1$ to the output destination O, and the second path from input source $I_2$ to the output destination O, wherein the first path and the second path are to use a same middle switch and a same connecting channel, and wherein the same middle switch and the same connecting channel are chosen so as to make the first path and the second path the least blocked paths from the input sources $I_1$ and $I_2$ to the output destination O, attempting to free, by rearrangement, all channels that are hierarchically under the connecting channel and that are blocking the path from the first input source $I_1$, and, if successful, attempting to free the channels that are hierarchically under the connecting channel and that are blocking the path from the second input source $I_2$;

in trial 2, attempted only if trial 1 fails, searching for the least blocked path from the first input source $I_1$ through a middle switch and a connecting channel to the output destination O, without regard for a path from the second input source $I_2$, attempting to free, by rearrangement, all channels that are hierarchically under the connecting channel and that are blocking the path from $I_1$, and, if successful, attempting to free, by rearrangement, the channels that are hierarchically under the connecting, channel and that are blocking the path from $I_2$;

in trial 3, attempted only if trials 1–2 fail, and only if trial 2 resulted in freeing the path from $I_1$, attempting to free, by rearrangement, the path from $I_2$ through the same middle switch but using an adjacent connecting channel;

in trials 4 and 5, attempted only if trials 1–3 fail, performing the same steps as trials 2 and 3, but with $I_1$ and $I_2$ interchanged, thereby allowing 2×1 SNCP connections with multicasting for multirate signals connected through the switching matrix.

13. A switching matrix for providing a connection for a composite signal, the switching matrix having only switching elements any of which are potentially available for use as part of a connection for the signal, the switching matrix comprising a stage of input switches, a stage of output switches, one or more stages of middle switches, and means for finding a path for a signal from one of the input switches to one of the output switches even when all possible paths through the switching matrix are blocked, the signal requiring a certain bandwidth and therefore a certain fraction of the throughput capacity of the switching matrix, a path constituting a set of connections from an input switch, through the switching matrix, to an output switch, the switching matrix carrying existing signals on existing paths created by having made existing connections, said finding means having:

1) means for searching for the path for the new signal, wherein the path does not require rearranging any existing connections, and, if the path is found, using the path for the new signal;
2) means for picking as a target path a partially blocked possible path through the switching matrix, the partially blocked possible path blocked by some existing connections carrying some existing signals requiring less bandwidth than the new signal; and
3) means for finding a different path for each existing signal carried by existing connections of the target path, by recursively using the means for searching for the path for the new signal and the means for picking as a target path a possible path through the switching matrix, with each existing signal carried by existing connections of the target path treated, in turn, as the new signal wherein the paths used are always paths providing a bandwidth adequate for the signal, for which a path is to be found, without fragmenting the signal into components.

* * * * *

UNITED STATES PATENT AND TRADEMARK OFFICE
CERTIFICATE OF CORRECTION

PATENT NO. : 5,987,027
DATED : November 16, 1999
INVENTOR(S) : Park et al.

It is certified that error appears in the above-identified patent and that said Letters Patent is hereby corrected as shown below:

At column 15, line 30 "clained" should be --claimed--.

At column 17, line 20 before "trial" --in-- should be inserted.

At column 17, line 47 after "connecting" delete ",".

Signed and Sealed this

Twenty-third Day of May, 2000

Attest:

Q. TODD DICKINSON

Attesting Officer     Director of Patents and Trademarks